Jan. 26, 1960
H. C. MORTON ET AL
2,922,221
FRICTION COMPOSITION
Filed Sept. 2, 1959
2 Sheets-Sheet 1
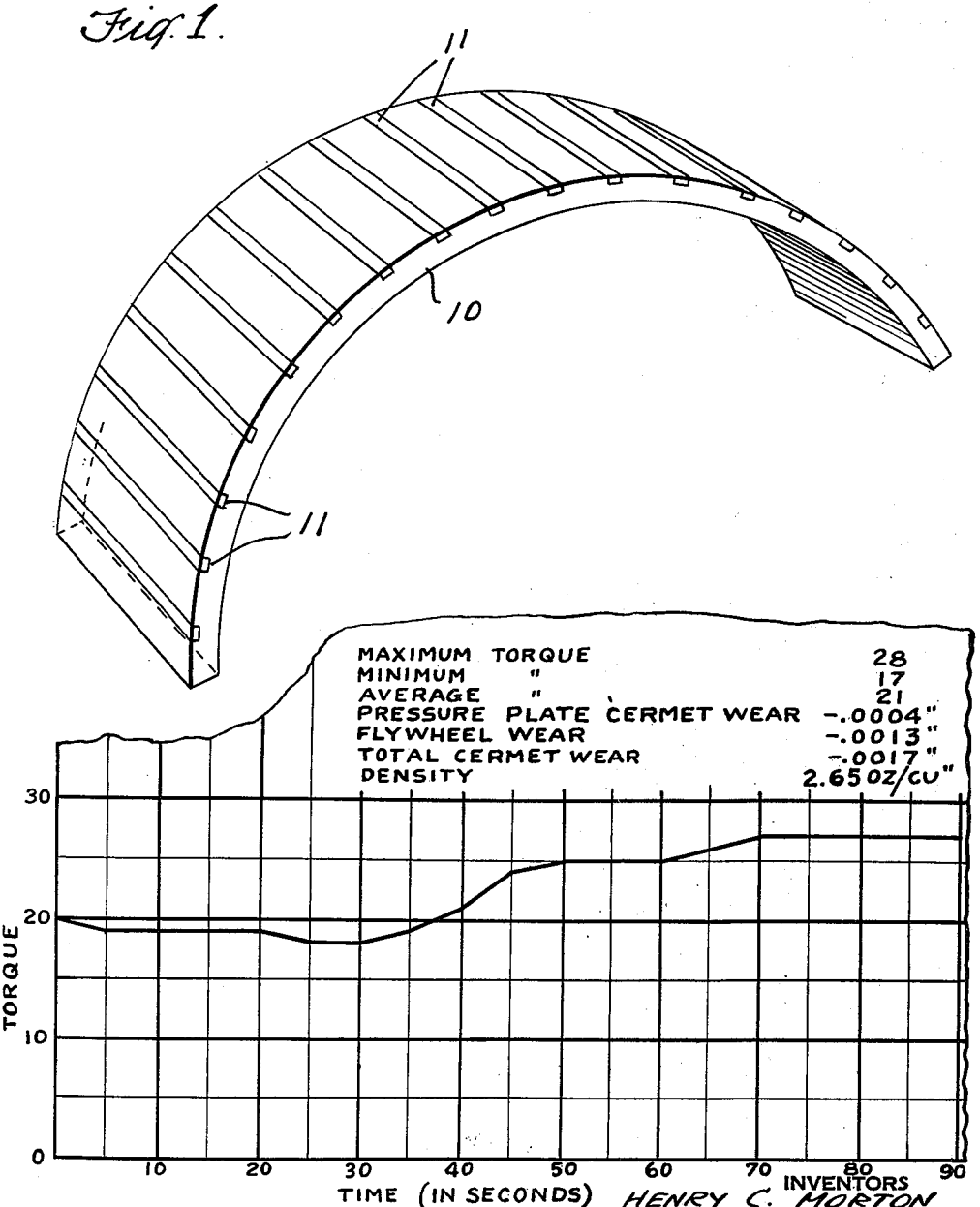
Fig. 1.
Fig. 2.
| MAXIMUM TORQUE | 28 |
| MINIMUM " | 17 |
| AVERAGE " | 21 |
| PRESSURE PLATE CERMET WEAR | -.0004" |
| FLYWHEEL WEAR | -.0013" |
| TOTAL CERMET WEAR | -.0017" |
| DENSITY | 2.65 OZ/CU" |
INVENTORS
HENRY C. MORTON
EDWARD WASHKEN
BY
ATTORNEY

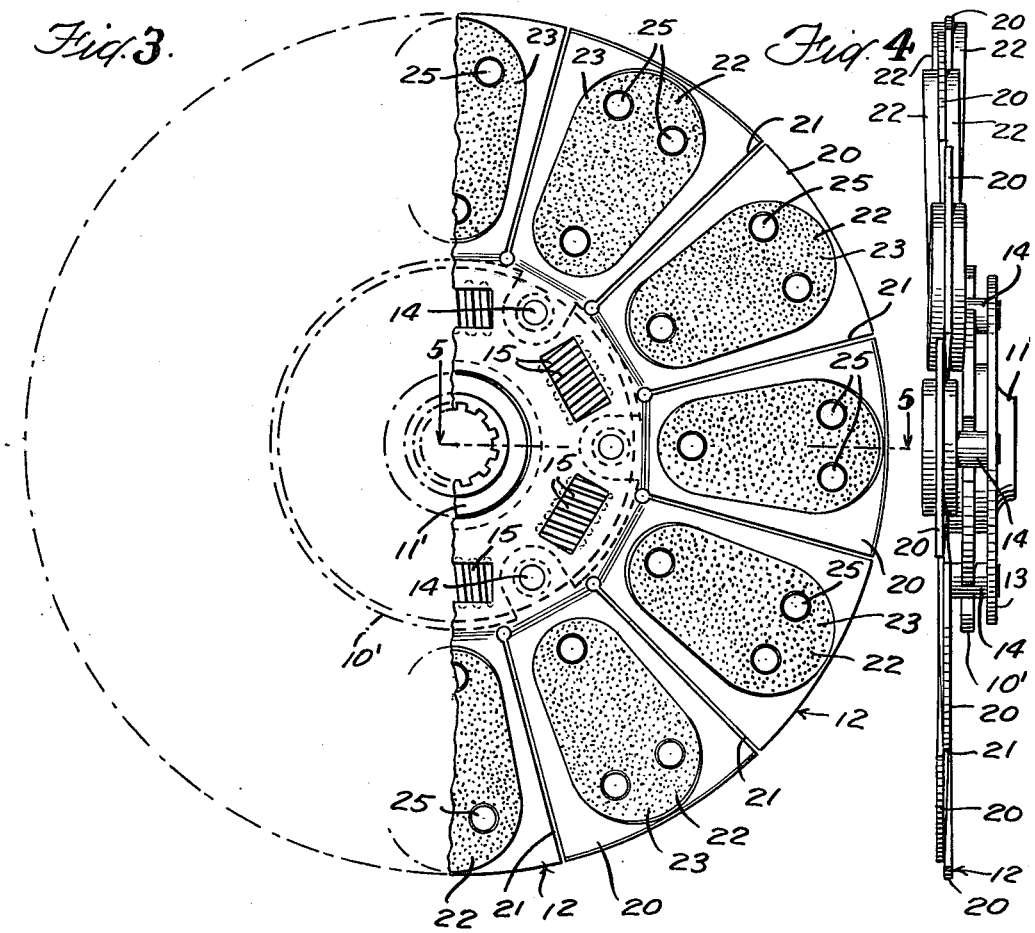
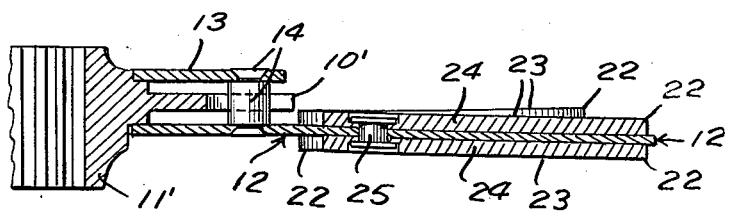

United States Patent Office 2,922,221
Patented Jan. 26, 1960

2,922,221
FRICTION COMPOSITION

Henry C. Morton, Branford, Conn., and Edward Washken, Belmont, Mass., assignors to The Russell Manufacturing Company, Middletown, Conn., a corporation of Connecticut Application September 2, 1959, Serial No. 839,044

10 Claims. (Cl. 29—182.5)

This invention relates to friction compositions and more particularly to compositions suitable for use as brake linings, clutch facings, or the like, wherein a mineral constitutes the basic friction element.

This application is a continuation-in-part of application S. No. 709,253 filed January 16, 1958 and application S. No. 743,455 filed June 20, 1958, now abandoned.

An object of the invention is to provide a friction composition of the above type which will retain its friction properties for long periods of use and which can be used in contact with metal surfaces without producing undue wear on such surfaces.

Another object of the invention is to provide a friction material of the above type which is capable of withstanding high temperatures.

Another object is to provide a cermet friction element having a metal backing and reinforcing member bonded thereto.

Another object is to provide a clutch disk having a facing composed of a plurality of such cermet friction elements.

Other objects and advantages will be apparent as the nature of the invention is more fully disclosed.

In our invention, the friction element consists of a suitable metallic matrix combined with a friction agent, specifically nepheline, admixed with other agents such as quartz, graphite, lead, zinc, suitably proportioned to meet a specified end use. The exact proportions of the above ingredients may be varied between wide limits or certain of the modifying agents other than the nepheline may be omitted entirely, depending upon the proposed usage. The friction agent, nepheline, is preferably present in the matrix in proportions of from 5% to 95% by weight.

We have discovered that nepheline, with the general formula of $(NaK)(AlSi)_2O_4$, possesses outstanding properties for use as a friction producing agent in high temperature applications wherein the nepheline is an integral part of the metallic matrix or cermet.

Nepheline is abundant in nature and extensive deposits of the nepheline syenites occur in the general region of Lakefield, Ontario, Canada. Recently higher nepheline content syenites have been discovered just north of Lakefield. The material mined at Lakefield, Ontario, has been found suitable for heavy duty clutch facings and brake linings, as set forth herein.

Silica, clay, silicon carbide, aluminum oxide and various commercial forms of these substances have been proposed for use as prime friction producing materials for high temperature usage because of their high strengths and abrasive character. These materials rank high in hardness on the Mohs' scale and, under high unit pressures such as encountered in industrial friction material usage, tend to wear the opposing metal surface at a rapid rate.

The usual commercial grade of nepheline can be heated to its melting point and subsequently cooled without loss of its original structural and chemical properties. This is a particularly advantageous feature because the retention of the nepheline properties throughout a wide range of temperatures result in a uniform friction pattern which remains consistent throughout the life of the friction articles.

Crystalline substances which are plastically deformable tend to yield plastically and this results in a "rounding off" of edges and corners during usage as a friction material. This "rounding off" or fire polishing causes a constantly varying frictional pattern which is not desirable. Nepheline, because of its crystalline structure is not plastically deformable according to definitions set forth in the literature, and therefore would not be expected to round-off or fire-polish at elevated temperatures. Nepheline yields in discrete fragments on fracture to constantly expose fresh areas of crystalline friction-producing nepheline, thus retaining a uniform friction pattern under all conditions of usage.

Nepheline possesses an indistinct cleavage which is advantageous to its use as a friction agent. Substances which have excellent cleavage tend to crush or disintegrate under high pressure.

Nepheline occurs naturally as short prismatic hexagonal crystals having rectangular and hexagonal sections. Thus, since nepheline has an indistinct cleavage it yields by irregular fracturing in usage thereby maintaining its frictional properties by the exposure of new surfaces. At the same time it exhibits excellent resistance to crushing or distintegration at high pressures.

Nepheline and other friction materials are suitably mixed with a binder such as copper powder. After mixing, the friction compound is molded under a pressure of 28 tons per square inch and the sintering operation carried out for twenty-five minutes at temperatures of 1700° F. to 1900° F., depending on properties desired in a carbon monoxide-carbon dioxide atmosphere using standard powder metallurgy techniques. The sintered ceramic button is then brazed to a mild steel backing plate by conventional methods to form a finished unit suitable for attachment to a clutch plate. The finished dimensions of the cermet may be varied to suit the end use as, for example, cold molded cermet strips one eighth inch square which may be combined with other types of friction linings to form a composite structure suitable for use as a brake or clutch lining.

The use of friction products in applications where high temperatures are developed requires compounds which are stable over a wide temperature range. It would be undesirable to use minerals which change chemically upon heating since this would lead to variations in frictional properties.

The desirable properties of nepheline may be summarized as follows:

(1) The naturally occurring pure form obviates the necessity of heat treatment to produce the friction producing compound. Firing is expensive and variations in products can occur.

(2) Being chemically and structurally stable over a wide temperature range its frictional properties are uniform and unvarying.

(3) Its regular crystalline habit makes it ideal for preparing a uniform and homogeneous mixture of ingredients which go to make up the frictional composition.

(4) A hardness of 5.5 on the Mohs' scale is sufficient to resist wear and yet is not excessively abrasive on the opposing metal surface.

(5) Its indistinct cleavage while retaining high resistance to structural change from elevated temperature and pressures.

(6) The high melting point of nepheline 1200° C. to 1300° C. depending on its composition.

Example 1

A thin layer of iron powder is placed in a mold, then the selected mixture of cermet material, selected according to any of the following examples, is placed in the mold in contact with the powdered iron layer and subjected to high pressures, for example of the order of 10 to 12 tons per square inch, in order to compress the metal and form a solid compacted structure. The structure is then removed from the mold and sintered at a temperature of 1750° F., for 25 minutes in a carbon monoxide-carbon dioxide atmosphere, using standard powder metallurgy techniques, coin at 28 tons per square inch and anneal at 1750° F. for 25 minutes. This process produces sintering between particles in the individual portions and securely sinters together the dissimilar layers. Carbon may be applied to the metal layer if desired prior to sintering whereupon the iron is carburized and converted into steel which forms a strong bond to the cermet and provides a reenforcement therefor which improves the wear characteristics of the cermet button which is adapted to be applied to a clutch disk or brake lining to constitute the friction surface thereof.

Example 2

The following cermet composition can be used in the procedure set forth in Example 1 for making heavy truck blocks or solid masses of cermet where flexibility or ductility is not required and very heavy frictional characteristics are required:

|  | Percent |
|---|---|
| Nepheline | 38 |
| Copper | 62 |

Example 3

A composition of 22% nepheline and 78% copper may be used for clutches which must be reasonably flexible and for the average type of ductility which would be needed where the friction material thickness is between 3/16" and 1/8", where slightly lower friction characteristics are required.

Example 4

Excellent results are obtained with the nepheline content as low as 5% and copper content 95% where repetitive action for light duty work in smaller type clutches and braking installations is required.

Example 5

A cermet composition of

|  | Percent |
|---|---|
| Nepheline | 5 |
| Zinc | 5 |
| Copper | 89 |
| Graphite | 1 | may be used for light duty repetitive applications.

Example 6

For truck brake blocks the following composition may be used:

|  | Percent |
|---|---|
| Nepheline | 38 |
| Zinc | 12 |
| Lead | 2 |
| Copper | 48 |

Small quantities of lead may be used in any of the above examples to reduce the brittleness of the product. Graphite provides lubrication which in certain uses improves the smoothness of operation of the clutch or brake. Zinc when used alloys with the copper to prevent smearing.

Specific embodiments of our invention have been illustrated in the accompanying drawings wherein:

Fig. 1 is a perspective view of a brake lining;

Fig. 2 is a graph showing a dynamometer test of the cermet friction composition; and Figs. 3 to 5 illustrate the use of a cermet button in connection with a standard clutch disk, Fig. 3 being a broken front elevational view of a clutch embodying the invention, Fig. 4 is a side elevational view of the clutch plate and Fig. 5 is a partial sectional view taken on line 5—5 in Fig. 3.

Referring now to the drawings for a detailed description of the invention, the reference numeral 10 in Fig. 1 indicates a lining of the usual form and material which is molded into arcuate form for attachment to the brake drum. Strips 11 of the above described cermet material are embedded in the lining 10. These strips 11 may be pressed into the lining while the latter is soft and are retained by the cured composition.

In this embodiment the strips 11 form a high temperature friction element to supplement the action of the usual molded composition 10. Of course, the entire element may be made of the cermet composition, if necessary.

Tests were conducted on a clutch dynamometer using standard clutch facing test procedure. A clutch spring pressure of 306 pounds was used which gave a load of 95 pounds per square inch on the test pieces. These test pieces were riveted to a small splined plate and installed on a stationary spline shaft. The flywheel and clutch revolve against the test pieces at a velocity of 1,125 r.p.m. for a total slip time of 90 seconds. The torque is transmitted through a torque arm and sylphon, then through a hydraulic line. Test result is recorded on a moving chart which is shown in Fig. 2.

Typical test results on compositions shown in Example 2 are as follows:

| | |
|---|---|
| Maximum torque | 28 |
| Minimum torque | 17 |
| Average torque | 21 |
| Pressure plate cermet wear ___inches__ | .0004 |
| Flywheel cermet wear _____do____ | .0013 |
| Total _____do____ | .0017 |
| Density _____oz./cu. in__ | 2.65 |

As indicated above, Figs. 3 to 5 are directed to the use of a cermet button in connection with a standard clutch disk. In these figures, the clutch plate is shown as comprising a disk 10' mounted on a hub 11' adapted to be mounted on the driven shaft not shown. A clutch plate 12 and a disk 13 are rotatably mounted on the hub 11' on opposite sides of the first disk 10' and are joined together by bolts 14. The plate 12 and disk 13 are connected to the first disk 10' by coiled springs 15 for limited relative movement as the clutch is engaged. The construction above described is standard and well known.

In accordance with this invention the clutch plate 12 is divided into peripheral segments 20 by a series of radial slots 21 and successive segments 20 are slightly displaced in a transverse direction to provide resilience when the clutch plate is compressed between opposed clutch surfaces during engagement.

Cermet buttons 22 formed as above described and consisting of a friction layer 23 of cermet material and a metal backing and reinforcing layer 24 are attached to the two sides of each of the segments 20 and secured by rivets 25 which extend through the opposed buttons 22 and through the metal of the clutch plate 12.

These cermet buttons provide the friction surface for the clutch plate and are brought into engagement with the cooperating clutch elements as the clutch is engaged. The resilience of the offset segments 20 prevents the clutch from gripping harshly or unevenly. During the normal operation, after the clutch has been fully engaged, the pressure exerted by the cooperating clutch elements is sufficient to bring all of the segments 20 into the same plane thereby providing a positive and firm engagement between the clutch elements.

The composition of the cermet may be varied as set forth in the above examples according to the intended use of the clutch plate.

It is to be understood of course that the cermet buttons are also applicable to other friction surfaces such as brake linings or the like, and the invention is not to be restricted to the specific embodiment herein set forth.

What is claimed is:

1. A cermet friction composition for use in clutch facings and brake linings, consisting essentially of nepheline crystals embedded in a metallic matrix, the nepheline crystals being present in a proportion of at least about 5% by weight.

2. A cermet friction composition for use in clutch facings and brake linings consisting essentially of nepheline crystals embedded in a sintered copper matrix, the nepheline crystals being present in a proportion of at least about 5% by weight.

3. A cermet composition as set forth in claim 2 in which said crystals are present in the proportion of 5% to 95% by weight.

4. A cermet composition as set forth in claim 2 in which the matrix contains a material selected from the group consisting of quartz, graphite, lead and zinc.

5. A friction element comprising a molded friction liner having embedded therein elements of a cermet consisting essentially of nepheline crystals embedded in a metal matrix, the nepheline crystals being present in a proportion of at least about 5% by weight.

6. A friction facing consisting essentially of nepheline crystals embedded in a sintered metal matrix, the nepheline crystals being present in a proportion of at least about 5% by weight.

7. In a clutch plate wherein friction buttons are mounted in spaced relation thereon, the improvement which comprises employing friction buttons having as the friction component a cermet composition consisting essentially of nepheline crystals embedded in a sintered metallic matrix, the nepheline crystals being present in a proportion of at least about 5% by weight, and a backing layer of sintered iron particles fused to said cermet composition.

8. In a clutch plate wherein friction buttons are mounted in spaced relation therein, the improvement which comprises employing friction buttons having as the friction component a cermet composition consisting essentially of nepheline crystals embedded in a copper matrix, the nepheline crystals being present in a proportion of at least about 5% by weight, and a backing layer of sintered iron particles fused to said cermet composition.

9. In a clutch plate wherein friction buttons are mounted in spaced relation therein, the improvement which comprises employing friction buttons having as the friction component a cermet composition consisting essentially of nepheline crystals being present in a proportion from 5 to 95% by weight, and a backing layer of sintered iron particles fused to said cermet composition.

10. In a clutch plate wherein friction buttons are mounted in spaced relation therein, the improvement which comprises employing friction buttons having as the friction component a cermet composition consisting essentially of nepheline crystals embedded in a copper matrix, containing a material selected from the group consisting of quartz, graphite, lead and zinc, the nepheline crystals being present in a proportion of at least about 5% by weight, and a backing layer of sintered iron particles fused to said cermet composition.

References Cited in the file of this patent

UNITED STATES PATENTS 2,818,634  Batchelor et al. _____ Jan. 7, 1958